United States Patent [19]

Sauer

[11] 4,451,070
[45] May 29, 1984

[54] HOSE COUPLING

[75] Inventor: Heinz Sauer, Ronneburg, Fed. Rep. of Germany

[73] Assignee: Rasmussen GmbH, Maintal, Fed. Rep. of Germany

[21] Appl. No.: 245,186

[22] Filed: Mar. 18, 1981

[30] Foreign Application Priority Data

Mar. 19, 1980 [DE] Fed. Rep. of Germany ....... 3010425

[51] Int. Cl.³ ............................................. F16L 33/22
[52] U.S. Cl. ..................................... 285/242; 285/423
[58] Field of Search ............... 285/242, 243, 320, 423, 285/322; 29/450, 525

[56] References Cited

U.S. PATENT DOCUMENTS

| | | | |
|---|---|---|---|
| 562,922 | 6/1896 | Schulze | 285/242 X |
| 1,478,452 | 12/1923 | Nelson | 285/322 |
| 3,243,206 | 3/1966 | Somer | 285/322 X |
| 3,262,721 | 7/1966 | Knight | 285/242 X |
| 3,724,882 | 4/1973 | Dehar | 285/243 |
| 3,868,130 | 2/1975 | Schwertner et al. | 285/423 |
| 3,891,250 | 6/1975 | Oetiker | 285/242 |
| 3,938,237 | 2/1976 | Dunz | 285/242 X |

FOREIGN PATENT DOCUMENTS

| | | | |
|---|---|---|---|
| 1600480 | 5/1970 | Fed. Rep. of Germany | 285/242 |
| 2546230 | 4/1976 | Fed. Rep. of Germany | 285/242 |
| 89804 | 12/1958 | Netherlands | 285/242 |
| 863523 | 3/1961 | United Kingdom | 285/242 |

*Primary Examiner*—Dave W. Arola
*Attorney, Agent, or Firm*—Peter K. Kontler

[57] ABSTRACT

A hose coupling is of the type wherein the end portion of an elastic hose is slipped over a pipe whose end portion has at least one external collar. The hose is held against axial movement relative to the pipe by a ring-shaped elastic clamping device having an internal bead whose inner diameter exceeds the maximum diameter of the collar. The outer diameter of the end portion of the hose in unexpanded condition of such end portion also exceeds the maximum diameter of the collar. The wall thickness of the end portion of the hose is such that it exceeds half the difference between the inner diameter of the bead and the maximum diameter of the collar. The clamping device is slipped onto the end portion of the hose before the end portion of the hose is slipped onto the end portion of the pipe whereby the clamping device travels over and beyond the collar.

32 Claims, 8 Drawing Figures

HOSE COUPLING

BACKGROUND OF THE INVENTION

The present invention relates to devices for connecting end portions of flexible tubular elements, such as hoses, with end portions of rigid or substantially rigid tubular members in the form of pipes, conduits or the like. More particularly, the invention relates to improvements in couplings of the type wherein the end portion of a tubular element (hereinafter called hose) must be expanded in order to slip it onto the end portion of a rigid tubular member (hereinafter called pipe) and the external surface of the end portion of the pipe has one or more circumferentially extending ribs or collars over which the end portion of the hose must extend preparatory to or during proper connection of the two end portions to each other.

Hose couplings of the above outlined character further comprise a clamping ring or clip which surrounds the end portion of the hose and biases it against the external surface of the end portion of the pipe inwardly of the collar, i.e., at that side of the collar which faces away from the free end or end face of the end portion of the pipe. As a rule, or at least in many instances, the collar or rib on the end portion of the pipe has a radially extending annular shoulder which faces away from the free end face of the pipe and a conical external surface which tapers radially inwardly in a direction from the radially outermost (maximum-diameter) part of the collar toward the end face of the pipe. Such conical surface facilitates slipping of the end portion of the hose onto the end portion of the pipe. The clamping ring or clip of a conventional hose coupling surrounds the end portion of the hose in the region which is adjacent to the aforementioned shoulder of the collar on the end portion of the pipe. The deforming action of the clamping ring or clip must be sufficient to prevent separation of the end portion of the hose from the end portion of the bipe in response to increasing pressure of fluid which is conveyed through the hose. Such fluid tends to move the end portion of the hose axially of and away from the end portion of the pipe whereby, in the absence of a satisfactory clamping action, the end portion of the hose is likely to slip over the collar, along the aforementioned tapering conical surface, and beyond the end face of the end portion of the pipe.

In a conventional hose coupling, the inner diameter of the narrowest (smallest-diameter) portion of the clamping ring or clip is less than the maximum outer diameter of the collar on the end portion of the pipe. In fact, many clamping rings are provided with pronounced internal beads having inner diameters which are invariably smaller than the outer diameter of the collar so as to ensure that the properly applied clamping ring, and more particularly the bead of such ring, can furnish a reliable and positive clamping action wich prevents separation of the end portion of the hose from the end portion of the pipe. A drawback of such hose couplings is that the clamping ring cannot be slipped over the collar of the pipe. Consequently, in order to properly mount the clamping ring on the pipe, it is necessary to slip the clamping ring onto the pipe at that end of the pipe which is remote from the end portion bearing the collar or collars. In other words, the clamping ring must be slipped onto the pipe in a first step, the end portion of the hose must be slipped over the corresponding end portion of the pipe (namely, over the end portion which bears the collar or collars) in a second step, and the clamping ring must be slipped onto the expanded end portion of the hose in a third step. This is a time-consuming operation and necessitates the exertion of substantial skill and, quite frequently, the exertion of a substantial force because the bead at the inner side of the clamping ring must be forced over and beyond the free end face of the already expanded end portion of the hose.

OBJECTS AND SUMMARY OF THE INVENTION

An object of the invention is to provide a novel and improved hose coupling which can be assembled or taken apart with little loss in time.

Another object of the invention is to provide a hose coupling which can furnish a satisfactory sealing action in spite of the fact that the inner diameter of the clamping ring or clip is such that the ring can be slipped over the collar or collars on the pipe.

A further object of the invention is to provide a novel and improved clamping ring or clip for use in a hose coupling of the above outlined character.

An additional object of the invention is to provide a novel and improved hose for use in a coupling in the above outlined type.

Still another object of the invention is to provide a hose coupling wherein a group of preassembled components can be slipped onto the end portion of the pipe so that one can save at least one step during the assembly of the coupling.

A further object of the invention is to provide a hose coupling wherein the clamping ring can furnish a multiple sealing and retaining action.

Still another object of the invention is to provide a hose coupling which remains fluidtight even when the temperature of its components fluctuates within an extremely wide range.

An additional object of the invention is to provide a hose coupling whose sealing action improves in response to movement of the hose relative to the pipe in a direction to terminate the sealing connection therebetween.

Another object of the invention is to provide a hose coupling which can be automatically assembled or taken apart by resorting to relatively simple machinery.

Still another object of the invention is to provide a hose coupling wherein a damaged or destroyed clamping ring or clip can be readily replaced with little loss in time.

A further object of the invention is to provide a hose coupling which can utilize or which can be applied to conventional pipes and which renders it possible to take it apart or to reassemble it without necessitating detachment of the pipe from the component or components (e.g., additional pipes) with which the pipe is connected when in actual use.

A further object of the invention is to provide a hose coupling whose components can be manufactured of a variety of readily available materials and which can be put to any one of a practically unlimited number of different uses.

An ancillary object of the invention is to provide a hose coupling which can furnish a reliable sealing action in spite of the fact that its clamping ring or clip has a larger inner diameter than the maximum outer diameter or diameters of the collar or collars at the exterior of the pipe.

The invention is embodied in a hose coupling which comprises a pipe including a first end portion which has an end face and an external ring-shaped collar or rib on the first end portion, a hose which includes an elastically deformable end portion having a predetermined wall thickness when in undeformed condition and surrounding the first end portion and the collar or collars of the pipe, and a ring-shaped clamping device or clip surrounding the end portion of the hose and having a ring-shaped internal bead. The collar of the pipe is disposed between the bead and the end face of the first end portion, and the inner diameter of the bead and the outer diameter of the second end portion (in undeformed conditions of such parts) exceed the outer diameter of the collar or collars on the end portion of the pipe. The wall thickness of the end portion of the hose (in undeformed condition of such end portion) exceeds half the difference between the inner diameter of the bead and the outer diameter of the collar. In other words, the clamping device can be slipped onto the end portion of the hose, and the end portion of the hose can thereafter be slipped onto the end portion of the pipe so that the end portion of the hose surrounds the collar and the clamping device moves to that side of the collar which faces away from the end face of the end portion of the pipe.

The clamping device, or at least the bead of the clamping device, preferably consists of an elastically deformable materials such as spring steel, aluminum or a suitable synthetic plastic substance.

In accordance with a presently preferred embodiment of the invention, the clamping device can be formed with two internal beads which are spaced apart from each other so that the collar on the end portion of the pipe can be located between the two beads of the clamping device. Alternatively, both beads can be located at that side of the collar which faces away from the end face of the respective end portion of the pipe. If the pressure within the hose increases, the hose tends to slip off the end portion of the pipe. At such time, the bead or beads of the clamping device move nearer to the maximum-diameter portion of the collar and prevent further slippage of the hose. The same situation can arise if the hose undergoes permanent deformation in the region between the bead or beads of the clamping device and the collar. If the pressure within the hose increases, the hose slides in a direction to place a mass of still elastomeric material between the bead and the collar so that the sealing action is restored.

The novel features which are considered as characteristic of the invention are set forth in particular in the appended claims. The improved hose coupling itself, however, both as to its construction and the mode of assembling the same, together with additional features and advantages thereof, will be best understood upon perusal of the following detailed description of certain specific embodiments with reference to the accompanying drawing.

DESCRIPTION OF THE PREFERRED EMBODIMENTS

Figure 1:
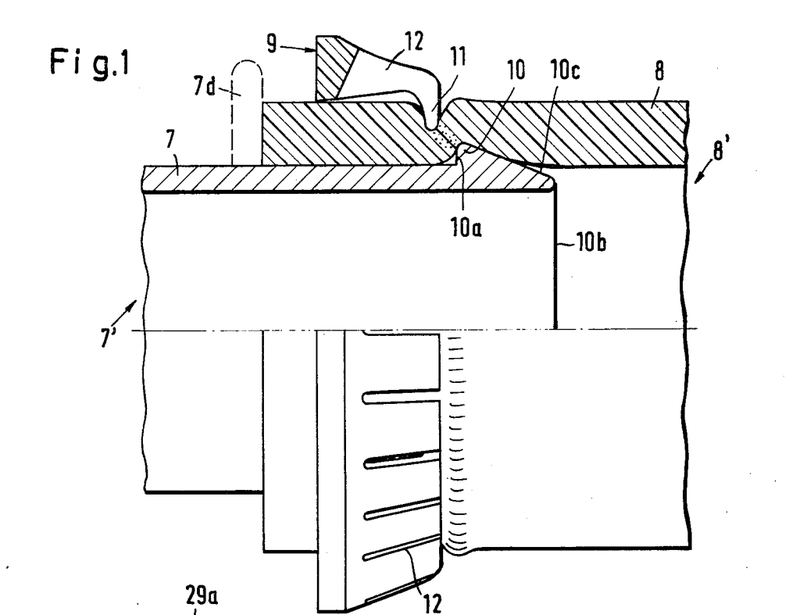
FIG. 1 is a fragmentary partly elevational and partly axial sectional view of a hose coupling which embodies one form of the invention, the clamping device having a single internal bead.

Referring first to FIG. 1, there is shown a hose coupling which comprises three main components, namely, the end portion 7 of a rigid tubular member 7' which is a piece of metallic or plastic pipe or conduit (hereinafter called pipe), an elastically deformable (radially expandible) hose 8' having an end portion 8 which is at least partially expanded and surrounds the end portion 7 of the pipe 7', and a ring-shaped clamping device 9 (hereinafter called clip or ring) which surrounds the end portion 8 of the hose 8'. The hose 8' preferably consists of a suitable elastomeric synthetic plastic material, such as ethylene-propylene-diene-monomer-rubber (EPDM-rubber), ethylene-propylene-terpolymer-rubber (APTK), polyvinyl chloride (PVC) or natural rubber. The clamping ring 9 consists of an elastic material which, however, is more rigid than the material of the hose 8'. For example, the ring 9 may consist of spring steel, aluminum or a synthetic plastic substance, such as polyamide, which is reinforced by glass fibers.

The end portion 7 of the pipe 7' has an external collar or rib 10 which is a circumferentially complete body and has a radially extending shoulder 10a facing away from the end face 10b of the end portion 7. The collar 10 is further formed with a conical external surface 10c which tapers radially inwardly toward the common axis of the end portions 7 and 8 in a direction from the maximum-diameter portion of the collar toward the end face 10b. The conical surface 10c facilitates the introduction of the end portion 7 of the pipe 7' into the interior of the end portion 8 of the hose 8'.

The ring 9 is located to the left of the collar 10, i.e., the collar 10 is located between an annular internal bead 11 of the ring 9 and the end face 10b of the end portion 7. The bead 11 is a composite internal constriction at the right-hand end of the ring 9 and deforms the external surface of the end portion 8 so as to subject the adjacent part of the end portion 8 to a compressive stress, especially in the region which is indicated by dots. Such region extends between the innermost portion of the bead 11 and the maximum-diameter portion of the collar 10 and establishes a sealing action between the end portions 7 and 8 so that a fluid which is conveyed through the hose coupling cannot escape by flowing in a direction to the left from the end face 10b and along the exterior of the end portion 7. As shown in FIG. 1, the ring 9 is formed with a plurality of preferably equidistant axially parallel narrow slots 12 which enhance the deformability of the bead 11 but still enable the ring 9 to maintain the innermost portion of the bead 11 at a requisite distance from the adjacent portion of the external surface of the end portion 7. It will be noted that the slots 12 are elongated and extend from the right-hand end toward but short of the left-hand end of the ring 9, as considered in the axial direction of the hose coupling. Each slot 12 extends through the bead 11 and its length exceeds half the axial length of the clamping ring 9.

Prior to slipping it onto the end portion 7, the end portion 8 of the hose 8' has a predetermined outer diameter which is greater than the maximum-diameter of the collar 10. Furthermore, the smallest inner diameter of the ring 9 (i.e., the inner diameter of the bead 11) also exceeds the maximum diameter of the collar 10. The wall thickness of the end portion 8 (in undeformed condition of such end portion) exceeds one-half the difference between the inner diameter of the bead 11 and the maximum-diameter of the collar 10. This ensures that the material of the end portion 8 is deformed in the region between the bead 11 and the collar 10. The inner diameter of the major part of the ring 9 equals or exceeds the outer diameter of the end portion 8 in undeformed condition of the hose 8'. This renders it possible to readily slip the ring 9 onto the end portion 8 before the end portion 8 is slipped onto the end portion 7. Such assembly takes place in a direction from the right to the left, as viewed in FIG. 1, whereby the bead 11 of the ring 9 slides over the conical surface 10c and thereupon over the maximum-diameter portion of the collar 10 before it reaches the position which is shown in the drawing.

The hose coupling of FIG. 1 is assembled as follows:

Before the end portion 8 of the hose 8' is slipped onto the end portion 7 of the pipe 7', the clamping ring 9 is slid onto the end portion 8 whereby the bead 11 deforms the external surface of the end portion 8 and forms therein a circumferentially complete groove. Upon completion of such preliminary assembly, namely, upon connection of the ring 9 to the end portion 8, the assembly is connected with the pipe 7' by slipping the end portion 8 onto the end portion 7. This entails at least some expansion of the end portion 8 because the inner diameter of the end portion 8 in undeformed condition thereof is less than the outer diameter of the end portion 7. The end portion 8 is moved in a direction to the left, as viewed in FIG. 1, and/or the end portion 7 is moved in a direction to the right so that the bead 11 of the ring 9 slides over the conical surface 10c and thereupon over the maximum-diameter portion of the collar 10 to come to rest at that side of the collar 10 which is provided with the radial shoulder 10a. At least some radial expansion of the bead 11 will take place during travel of the ring 9 over the collar 10. As mentioned before, the ring 9 is preferably elastic (at least that portion thereof which includes the bead 11, i.e., at least that portion which is provided with the axially parallel slots 12); this facilitates the assembly of the hose coupling by rendering it possible to introduce the end portion 7 into the end portion 8 with the exertion of a relatively small effort.

The inner diameter of the bead 11 decreases as soon as the bead has moved over and beyond the maximum-diameter portion of the collar 10. This enables the bead 11 to compress the material of the hose 8' between its rounded innermost portion and the rounded outermost portion of the collar 10. Such rounding is desirable and advantageous in order to prevent penetration of the bead and/or collar 10 into the material of the end portion 8, namely, to prevent actual cutting of the material of the hose. Radial contraction of the bead 11 when the hose coupling is fully assembled, i.e., when the bead moves to the left of the shoulder 10a, can be detected by the person assembling the coupling so that such person knows that the sealing connection between the end portions 7 and 8 has been established. However, it does no harm if the end portion 8 is slipped onto the end portion 7 to such an extent that the bead 11 is rather remote from the shoulder 10a, i.e., further to the left than in the position shown in FIG. 1. All that can happen is that, when the pressure in the interior of the hose 8' increases, the end portion 8 tends to slide off the end portion 7 of the pipe 7' whereby the bead 11 approaches the shoulder 10a and prevents further slippage of the end portion 8 relative to the end portion 7 when its innermost portion is sufficiently close to the maximum-diameter portion of the collar 10.

An important advantage of the hose coupling which is shown in FIG. 1 is that it can be assembled, in part, prior to insertion of the end portion 7 of the pipe 7' into the end portion 8 of the hose 8'. This is due to the fact that the ring 9 can be slipped onto the end portion 8 before the end portion 8 is slipped onto the end portion 7. In other words, in contrast to the previously known hose couplings, the coupling of the present invention renders it possible to slide the ring 9 over the collar 10 in a direction such that the bead 11 slides along the conical external surface 10c in a direction from the end face 10b toward the maximum-diameter portion of the collar. In the previously discussed conventional hose couplings, it is necessary to place the clamping ring around the pipe 7' by sliding the clamping ring onto and beyond the left-hand end portion (not shown) of the pipe 7', by slipping the end portion of the hose over the ribbed end portion of the pipe, and by thereupon slipping the collar onto the expanded end portion of the hose at that side of the rib or collar on the pipe which faces away from the nearest end face of the pipe. Moreover, when the clamping ring of a conventional hose coupling must be moved to a position in which it surrounds the already expanded end portion of the hose, the hose must be held against axial movement in a direction to slide off the end portion of the pipe. This renders it difficult to assemble such conventional hose couplings in automatic or semi-automatic machinery. In addition, the improved hose coupling renders it possible to omit one of the steps, namely, the step of placing the clamping ring 9 around the end portion 7 of the pipe 7' prior to introduction of the end portion 7 into the end portion 8 of the hose 8'. The step of slipping the clamping ring 9 onto the end portion 8 of the hose 8' can be carried out in automatic machinery. The likelihood that the ring 9 would fall off the end portion 8 is remote, especially when the hose 8' is relatively rigid (but still elastic) because the bead 11 subjects the exterior of the end portion 8 to a sufficient deforming stress which ensures that the ring 9 cannot be readily shifted in the axial direction of the hose 8' unless the person in charge so desires. The placing of the clamping ring 9 onto the end portion 8 prior to insertion of the end portion 7 into the end portion 8 is desirable in many instances because the ring 9 is immediately at hand. Moreover, a machine can readily place each and every one of a large number of successive clamping rings 9 in an optimum position with reference to the respective end portions 8. The assemblies of rings 9 and associated hoses 8' can be put to storage for any desired period of time. Moreover, such assemblies can be readily shipped to the locales of intended or future use, i.e., to the locations where the end portions 8 of the hoses 8' are to be connected with the end portions 7 of metallic, plastic or other rigid or substantially rigid pipes. In fact, once a ring 9 is placed around the end portion 8 of the respective hose 8', it can remain in such position during storage, during transport, during assembly with the pipe, as well as subsequent to such assembly.

The improved hose coupling ensures a reliable and fluidtight connection between the end portions 7 and 8 even though the inner diameter of the bead 11 exceeds the maximum diameter of the collar 10. The width of the bead 11 (as considered in the axial direction of the pipe 7') is preferably small so that the tip of the bead exerts pressure upon a relatively small portion of the external surface of the end portion 8. This results in generation of a substantial pressure on the hose 8' so that the bead 11 can effect a pronounced deformation of the external surface of the end portion 8 without actually cutting the material of the hose 8'. Therefore, that material of the end portion 8 which is immediately adjacent to the internal surface or the innermost portion of the bead 11 bears against the external surface of the end portion 7 to the left of the shoulder 10a with a force which is sufficient to establish a satisfactory sealing action between the pipe and the hose. At the same time, the bead 11 can readily expand during slipping of the end portion 8 (with the clamping ring 9 thereon) onto the end portion 7 of the pipe 7'. The force which is necessary for such application can be readily exerted by the attendant or operator because it need not exceed 80–160 newtons. As a rule, such force need not be in excess of 100 newtons. This is in contrast to the utilization of a clamping ring which has a bead of substantial width, as considered in the axial direction of the end portion 8 of the hose 8'.

As stated above, the dots in FIG. 1 denote that region of the end portion 8 where the material of the hose 8' is subjected to quite pronounced stresses between the innermost portion of the bead 11 and the maximum-diameter portion of the collar 10. This also contributes to a highly satisfactory sealing action and, at the same time, prevents the hose 8' from moving axially of the pipe 7' in a direction to move the ring 9 to the right of the shoulder 10a.

Another important advantage of the improved hose coupling is that, when the material of the hose 8' undergoes permanent deformation as a result of the application of uninterrupted pressure against the elastomeric material between the bead 11 and the collar 10, the sealing action between the hose and the pipe is not terminated because the permanently deformed portion of the hose is simply shifted to the right of the maximum-diameter portion of the collar 10 and a mass of readily deformable or elastomeric material of the hose 8' is moved between the bead 11 and the collar 10. The situation is analogous when the hose 8' is alternately heated to elevated temperatures and cooled to relatively low temperatures so that its material expands and contracts within a rather wide range. The elastic bead 11 then simply contracts in response to cooling of the material of the hose 8' and expands in response to heating of such material with attendant regulation of the sealing and retaining action upon the end portion 8. The likelihood of permanent deformation of the material of the hose 8' is especially pronounced if the material of the hose is a synthetic plastic substance such as EPDM.

Since the inner diameter of the clamping ring 9 decreases in a direction from the left-hand end toward the right-end of the ring, as considered in FIG. 1, the material between the two ends of the ring invariably contains portions which do not undergo excessive deformation or permanent deformation in response to excessive heating of the material of the hose. Consequently, at least some of the material within the confines of the ring 9 is capable of establishing a proper sealing action as soon as such material is shifted into the region within the confines of the bead 11. In fact, the pressure between the clamping ring 9 and the end portion 8 of the hose 8' can gradually decrease from a maximum value at the innermost end of the bead 11 to zero at the left-hand end of the ring 9. This renders it possible to invariably find, within the confines of the ring, areas which are sufficiently elastic to establish a proper sealing connection between the end portions 7 and 8 in response to axial shifting of the hose 8' in a direction to the right, as viewed in FIG. 1, if the material between the bead 11 and the collar 10 has undergone permanent deformation. Furthermore, it is not even necessary to effect any axial shifting of the hose 8' because the expansion of the material of the hose in response to heating automatically entails satisfactory sealing engagement between the external surface of the end portion 8 and a portion of the internal surface of the ring 9. If the material of the hose 8' between the bead 11 and the collar 10 has been subjected to permanent (non-restorable) deformation, the sealing action will take place to the left of the bead 11.

The left-hand end portion of the pipe 7' can be rigidly or separably connected with another pipe, with another hose or with any other part prior to or after assembly of the improved coupling. For example, the left-hand end portion of the pipe 7' can be formed with external or internal threads so that the pipe 7' can be separably connected with a second pipe having internal or external threads at that end thereof which is to be connected to the pipe 7'. In a pipeline which includes several pipes and at least one coupling of the type embodying the present invention, the operator can assemble or dismantle the component parts of the pipeline in any desired sequence, i.e., the coupling can be assembled before the corresponding pipe is installed in the remaining part of the pipeline or vice versa.

Figure 2:
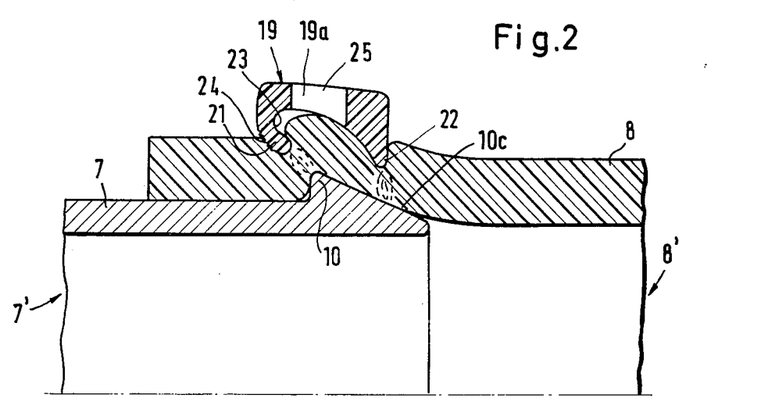
FIG. 2 is a fragmentary axial sectional view of a modified hose coupling wherein the clamping device has two discrete internal beads disposed at the opposite sides of the collar on the end portion of the pipe.
Figure 3:
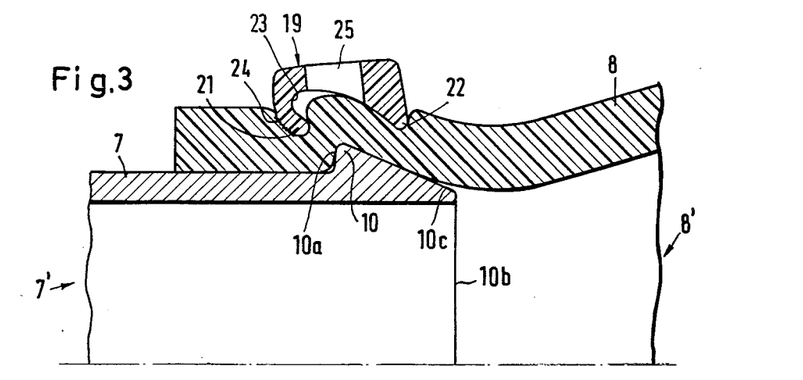
FIG. 3 illustrates the coupling of FIG. 2 with the clamping device in a position it assumes subsequent or in response to internal expansion of the hose in the region to the right of the end portion of the pipe.

In the hose coupling which is illustrated in FIGS. 2 and 3, the end portion 8 of the hose 8' is held on the end portion 7 of the pipe 7' by a modified clamping ring or clip 19. The material of the ring 19 may be the same as that of the ring 9 which is shown in FIG. 1. In contrast to the ring 9, the ring 19 of FIGS. 2 and 3 comprises two beads 21 and 22 which are disposed at the opposite sides of the maximum-diameter portion of the circumferential collar or rib 10 on the end portion 7. The inner side of the left-hand bead 21 (which performs the function of the single bead 11 shown in FIG. 1) is bounded by a concave surface 23 which defines a recess or socket for some elastomeric material of the end portion 8. The outer (left-hand) side of the left-hand bead 21 is bounded by a convex surface 24 which can but need not be knurled, milled or otherwise roughened.

The smallest diameter of the left-hand bead 21 equals or approximates the smallest diameter of the right-hand bead 22 (see FIG. 2) in normal condition of the coupling. However, when the pressure in the interior of the hose 8' increases, the ring 19 can be tilted about an imaginary axis which is located at the tip or outermost portion of the collar 10 so that the ring 19 assumes a position similar to or identical with that shown in FIG. 3.

FIG. 2 further shows that the inner diameter of the ring 19 decreases gradually in a direction from the region of the left-hand bead 21 toward the right-hand bead 22. On the other hand, the external surface of the ring 19 is substantially cylindrical, i.e., the diameter of such external surface does not change or changes relatively little all the way between the left-hand and right-hand end faces of the ring 19, as viewed in FIG. 2. The ring 19 is also provided with an annulus of elongated axially parallel slots 25 which are open only at their radially innermost and outermost ends. The slots 25 are provided in the intermediate or median connecting portion 19a of the ring 19, namely, in that portion which connects the left-hand bead 21 with the right-hand bead 22. The neighboring slots 25 are preferably equidistant from each other, as considered in the circumferential direction of the ring 19.

The mode of assembling the hose coupling of FIGS. 2 and 3 is analogous to the manner of assembling the coupling of FIG. 1. Thus, the ring 19 can be slipped onto the external surface of the end portion 8 before the latter is slipped onto the end portion 7 in a direction to the left, as viewed in FIG. 2, so that the left-hand bead 21 moves beyond the conical surface 10c of the collar 10 and is ultimately located to the left of the radial shoulder 10a. When the assembly of the hose coupling of FIGS. 2 and 3 is completed, there develop two pronounced compression zones in the material of the end portion 8 of the hose 8'. Such zones are denoted in FIG. 2 by dots. The left-hand zone extends between the innermost portion of the left-hand bead 21 and the tip of the collar 10. The right-hand zone extends between the innermost portion of the bead 22 and the adjacent portion of the conical surface 10c. Each such zone is capable, by itself, of ensuring a satisfactory sealing action between the internal surface of the end portion 8 and the external surface of the end portion 7. Furthermore, the bead 21 cooperates with the collar 10 to prevent separation of the end portions 7 and 8 from each other. FIG. 2 shows that a portion of the recess which is bounded by the concave surface 23 at the inner side of the bead 21 is not or need not be completely filled with the material of the end portion 8. Consequently, the pressure upon the material of the end portion 8 between the beads 21 and 22 varies from a highly pronounced pressure between the bead 21 and the tip of the collar 10 to zero pressure in the region of the inner ends of the slots 25 and to substantial pressure in the zone between the innermost portion of the bead 22 and the median portion of the conical surface 10c. The advantages of such deformation or lack of deformation of the material of the end portion 8 between the beads 21 and 22 will be readily appreciated upon perusal of the description of the hose coupling of FIG. 1. Thus, at least some material of the end portion 8 between the beads 21 and 22 remains elastically deformable so that it can establish a satisfactory sealing action between the bead 22 and the surface 10c of the hose 8' is shifted in a direction to the right, for example, as a result of permanent deformation of the zones which are indicated by dots. Such permanent deformation can take place in response to prolonged use of the hose coupling, aging of the material of the hose and/or in response to pronounced heating of the material of the hose.

When the pressure of fluid in the hose 8' increases well beyond the normal or anticipated value, the hose 8' expands in a manner as shown in FIG. 3. At the same time, the elastically deformable ring 19 (which, however, is more rigid than the end portion 8) also expands, at least in the region of the right-hand bead 22, so that the ring 19 is tilted in the aforementioned manner and the pressure between the surface 10c and the adjacent material of the end portion 8 is reduced accordingly because the expanding hose 8' tends to move the internal surface of the end portion 8 away from the collar 10. The just discussed tilting of the ring 19 results in contraction of the left-hand portion of the ring so that the inner diameter of the bead 21 decreases and this bead furnishes a more pronounced sealing action. At the same time, the expanding hose 8' tends to slide off the end portion 7 of the pipe 7' with the result that the bead 21 moves closer to the maximum-diameter portion of the collar 10 (closer to the shoulder 10a) whereby the sealing action of the bead 21 increases for two reasons, namely, as a result of movement of the innermost portion of the bead 21 closer to the external surface of the end portion 7 in the region to the left of the shoulder 10a, and also as a result of movement of the contracted bead 21 toward the maximum-diameter portion of the collar 10. The slots 25 enhance the tilting action of the expanded hose 8' upon the ring 19 and thereby contribute to a reliable sealing action, even when the pressure in the interior of the hose 8' is increased well beyond the anticipated or normal value.

An advantage of the coupling of FIGS. 2 and 3 is that the collar 10 urges the material of the end portion 8 of the hose 8' into the space between the beads 21 and 22 to thereby furnish a surprisingly satisfactory sealing action. Moreover, the device 19 reliably holds the end portion 8 against any or against appreciable axial movement in either direction until and unless the operator desires to dismantle the coupling.

The slots 25 in the central or median portion 19a of the ring 19 allow for expansion of the portion 19a in response to development of excessive stresses upon the material of the hose 8' in the space between the beads 21 and 22.

Figure 4:
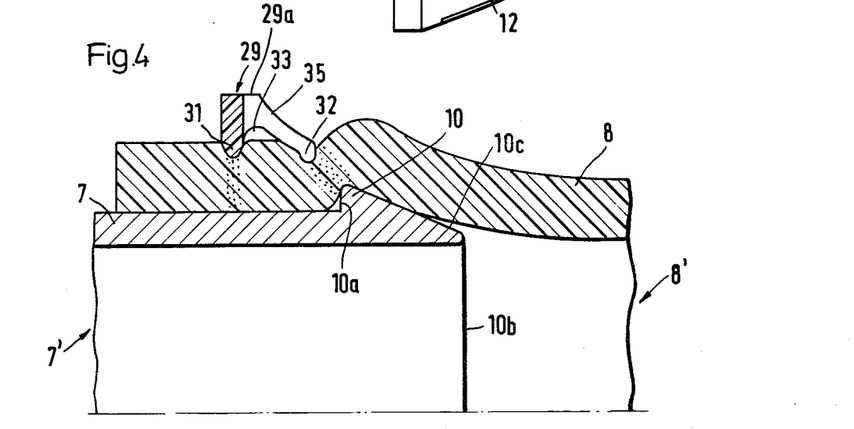
FIG. 4 is a fragmentary axial sectional view of a hose coupling which constitutes a modification of the coupling shown in FIGS. 2 and 3.

FIG. 4 illustrates a third embodiment of the improved hose coupling wherein the collar 10 is disposed to the right of a modified clamping ring or clip 29 having two discrete inwardly extending beads 31 and 32. When in normal condition, the inner diameters of the beads 31 and 32 are substantially identical. The major part of the ring 29 is slotted, as shown at 35. The slots 35 extend in parallelism with the axis of the ring 29 and through the entire ring from the right-hand side of the left-hand bead 31 all the way to the other end of the ring. Thus, the right-hand bead 32 consists of an annulus of discrete sections which are separated from each other by the corresponding slots 35, and such slots also divide the intermediate or connecting portion 29a of the ring 29 into a plurality of segments which form an annulus between the beads 31 and 32. The reference character 33 denotes a ring-shaped undercut recess or cavity between the beads 31 and 32 at the inner side of the ring 29. This recess is at least partially unoccupied so that at least some of the material of the end portion 8 remains elastic even if the deformation of such material in the regions which are indicated by dots becomes permanent after a prolonged use of the hose coupling and/or as a result of heating of the end portion 8 to an elevated temperature at which such end portion expands sufficiently to entail permanent deformation as a result of correspondingly increased pressure which is applied by the less elastic ring 29 in cooperation with the end portion 7 of the pipe 7'. The material of the ring 29 is or may be identical with the material of the ring 9 or 19.

The inner diameters of the beads 31 and 32 exceed the maximum diameter of the collar 10 so that the ring 29 can be slipped onto the end portion 8 of the hose 8' before such end portion is slipped onto the end portion 7 of the pipe 7'.

The configuration of the concave surface which bounds the recess 33 between the beads 31 and 32 need not be regular. In other words, the two halves of such surface need not be mirror symmetrical to each other with reference to a plane which is normal to the axis of the pipe 7' and extends midway between the beads 31 and 32. In the embodiment of FIG. 4, the diameter of the concave surface increases abruptly in the region which is adjacent to the right-hand side of the left-hand bead 31 and thereupon decreases more gradually in a direction toward the bead 32. The width of each of the two beads 31 and 32 is relatively small (as considered in the axial direction of the ring 29) in order to ensure that the innermost portions of such beads can exert a pronounced pressure against the external surface of the end portion 8 for the purpose which was explained in connection with the hose coupling of FIG. 1.

The outer surface of the ring 29 has a substantially cylindrical portion which is adjacent to and surrounds the bead 31 as well as the left-hand part of the connecting portion 29a. The remaining part of the external surface of the ring 29 tapers in the same direction as the conical surface 10c of the collar 10 on the end portion 7 of the pipe 7'. Such configuration of the ring 29, in addition to the provision of the slots 35, contributes to requisite elasticity of the ring so that the latter can be moved over the collar 10 during assembly of the end portion 8 with the end portion 7.

The manner of assembling the hose coupling of FIG. 4 is substantially identical with that of assembling the coupling of FIGS. 2 and 3 except that the entire clamping ring 29 is moved to the left of the shoulder 10a, i.e., to that side of the collar 10 which faces away from the end face 10b of the end portion 7 of the pipe 7'. In view of such mounting or positioning of the ring 29, a first zone of maximum compression of the end portion 8 (indicated by dots) develops in a region which is located well to the left of the collar 10 and is remote from the shoulder 10a, and a second zone develops in the region between the innermost portion of the bead 32 and the maximum-diameter portion of the collar 10. The provision of the recess 33 and the configuration of the concave surface which surrounds this recess ensures that the material of the end portion 8 between the beads 31 and 32 remains elastic even if the dotted zones undergo permanent deformation for reasons which were pointed out above in connection with the hose couplings of FIGS. 1 and 2-3.

Figure 5:
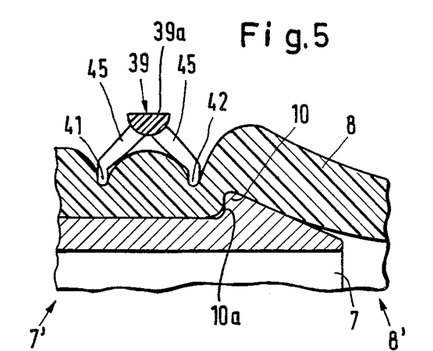
FIG. 5 is a fragmentary axial sectional view of a modification of the hose coupling shown in FIG. 4.

The hose coupling of FIG. 5 differs from the coupling of FIG. 4 in that the clamping ring 39 has two substantially mirror symmetrical beads 41 and 42 which are connected to each other by a central portion 39a. The reference characters 45 denote axially parallel slots which are provided in the beads 41, 42 but not in the central portion 39a. It can be said that the cross section of the clamping ring 39 resembles the letter V or the tail of a fish. The slots 45 contribute to higher elasticity or deformability of the respective beads 41 and 42. Each of these beads is located to the left of the collar 10 on the end portion 7 of the pipe 7'. However, it is clear that the ring 39 of FIG. 5 can also be mounted in a manner as illustrated in FIG. 2 so that the beads 41 and 42 will be located at the opposite sides of the maximum-diameter portion of the collar 10. The left-hand bead 41 effects pronounced compression of the end portion 8 of the hose 8' in a region which is remote from the shoulder 10a. On the other hand, the right-hand bead 42 performs the same function as the bead 21 of FIG. 2 or the bead 11 of FIG. 1, i.e., it cooperates with the collar 10 to establish a highly compressed zone of the end portion 8 in a region close to the shoulder 10a. If the hose 8' tends to expand and to slide off the end portion 7, the beads 41 and 42 advance toward the shoulder 10a and the bead 42 thereby cooperates with the collar 10 to establish a more satisfactory sealing action with the result that the axial movement of the end portion 8 in a direction to become separated from the end portion 7 is terminated.

Figure 6:
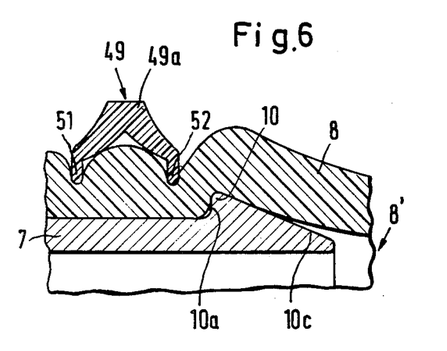
FIG. 6 is a fragmentary axial sectional view of a hose coupling which constitutes a modification of the coupling shown in FIG. 5.

FIG. 6 illustrates a further hose coupling wherein the clamping ring 49 resembles the clamping ring 39 and is mounted in a similar position, namely, to the left of the shoulder 10a on the collar 10. The main difference between the rings 39 and 49 is that the beads 51 and 52 of the ring 49 are not slotted. The cross section of the ring 49 also resembles the letter V. It can be said that the resemblance of the cross section of the ring 49 to a fishtail is even more pronounced than that of the cross section of the ring 39 shown in FIG. 5. The beads 51 and 52 are capable of radial expansion during movement over the conical surface 10c and the maximum-diameter portion of the collar 10, i.e., during assembly of the hose coupling which is shown in FIG. 6, because they are relatively narrow as considered in the axial direction of the ring 49. Furthermore, the material of the ring 49 is sufficiently elastic even though it is more rigid than the elastic material of the end portion 8 of the hose 8'. As shown in FIG. 6, when the hose coupling is fully assembled and the pressure in the interior of the hose 8' is not excessive, the external surface of the end portion 8 is contacted almost exclusively by the innermost portions of the beads 51 and 52 which deform such surface to produce two zones of pronounced sealing action between the internal surface of the end portion 8 and the external surface of the end portion 7. The resistance of the beads 51 and 52 to further radial expansion increases as soon as the diameters of the beads are at least slightly increased because the area of surface-to-surface contact between the beads and the end portion 8 increases in response to progressing expansion of such beads. Furthermore, and as can be readily seen in FIG. 6, the thickness of the central portion 49a of the ring 49 is greater than the thickness or width of the beads 51, 52 so that further enlargement of the inner diameter of the ring 49 is possible only by deformation of the central portion 49a. Such central portion offers a very pronounced resistance to expansion. The lever arms of the beads 51, 52 also decrease in response to radial expansion, and this contributes further to progressively increasing resistance to expansion of the ring 49 as soon as the initial expansion of the beads 51 and 52 is terminated. At any rate, radial expansion of the ring 49 does not suffice to permit a separation of the end portion 8 from the end portion 7 and/or penetration of any fluid between the external surface of the end portion 7 and the internal surface of the end portion 8, even if the pressure of fluid in the interior of the hose 8' increases well beyond the anticipated or normal value.

Figure 7:
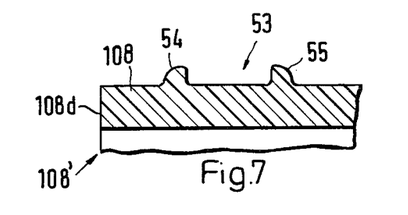
FIG. 7 is a fragmentary axial sectional view of one end portion of a hose with an external groove between two spaced-apart external flanges which can be used in the hose coupling of the present invention.

FIG. 7 illustrates a part of the end portion 108 of a modified hose 108' which can be utilized in the improved coupling. The external surface of the end portion 108 is formed with two spaced apart circumferentially complete ring-shaped flanges 54 and 55 which define a relatively wide annular groove 53 capable of accommodating at least a portion of a ring-shaped clip. For example, the groove 53 can be wide enough to provide room for the entire ring 9 between the flanges 54 and 55. The ring 9 is inserted into the groove 53 before the end portion 108 is slipped onto the end portion 7 of a pipe 7' (not shown in FIG. 7). This reduces the likelihood of undesirable wandering of the ring 9 axially of the end portion 108 while the latter is being assembled with the end portion 7 of a pipe.

The advantage of the groove 53 will be readily appreciated by referring again to FIG. 1 and by assuming that the groove 53 is dimensioned to receive the clamping ring 9. FIG. 1 shows, by broken lines, a ring-shaped stop or abutment means 7d which is located at a preselected distance from the shoulder 10a. The distance between the shoulder 10a and the stop 7d can be selected in such a way that the groove 53 of the end portion 108 in a fully assembled coupling including the pipe 7' of FIG. 1 and the hose 108' of FIG. 7 is located substantially midway between the shoulder 10a and the stop 7d or that the distance between the bead 11 and the shoulder 10a is somewhat less than the distance between the flange 54 and the free left-hand end face 108d of the end portion 108. Since the ring 9 is held in the groove 53 by the flanges 54 and 55, it remains in the preselected optimum position with reference to the end face 108d regardless of whether the end portion 108 is slipped onto the end portion 7 by hand or by a machine. In the absence of the groove 53, the ring 9 could move relative to the end face 108d, especially during assembly of the end portion 108 with the end portion 7, so that the bead 11 would be located to the right of the shoulder 10a, i.e., the bead 11 would surround the conical surface 10c of the collar 10.

Figure 8:
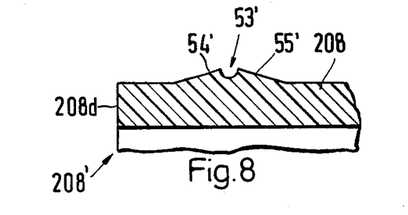
FIG. 8 is a fragmentary axial sectional view of one end portion of a modified hose.

Referring finally to FIG. 8, there is shown the end portion 208 of a further hose 208' having a free end face 208d and a relatively narrow groove 53' between two flanges 54' and 55'. The width of the groove 53' (as considered in the axial direction of the hose 208') suffices to receive a single bead, e.g., the bead 11 of the ring 9, the bead 21 or 22 of the ring 19, etc. The external surfaces of the flanges 54' and 55' slope radially inwardly in directions away from the groove 53' so as to facilitate the introduction of a bead into such groove regardless of whether the corresponding ring (e.g., the ring 9) is moved onto the end portion 208 in a direction from the free end face 208d or from the other direction.

The improved hose coupling is susceptible of many additional modifications without departing from the spirit of the invention. Thus, and as already mentioned before, the clamping ring 9, 19, 29, 39 or 49 may be made of a metallic material (such as spring steel, aluminum or zinc die casting metal). Furthermore, the clamping ring 9 of FIG. 1 can be mounted in inverted position so that the bead 11 is located to the left of the shoulder 10a but the major part of the ring is located to the right of the maximum-diameter portion of the collar 10. This further simplifies the assembly of the coupling because the major part of the ring 9 need not be slipped over the collar 10, i.e., it suffices to mount the ring 9 on the end portion 8 in such position that, when the end portion 8 is slipped over the end portion 7, only the bead 11 of the ring 9 must advance beyond the shoulder 10a. It is then possible to simplify the construction of the ring 9 by omitting the slots 12. The slots 35 of the ring 29 shown in FIG. 4 can be omitted if the ring 29 is mounted in such a way that its beads 31 and 32 are located at the opposite sides of the maximum-diameter portion of the collar 10, i.e., if the bead 32 surrounds the conical surface 10c.

It is further possible to use a clamping ring or clip which has a through slot so that the ring can expand or contract by increasing or reducing the width of such slot. The material of the slotted ring must be selected with a view to furnish the required clamping or deforming action when the bead or beads of the ring are moved to proper or final positions.

The ratio of the inner diameter of a bead to the maximum inner diameter of the respective clamping ring (e.g., the ratio of the inner diameter of the bead 11 to the maximum inner diameter of the ring 9) is preferably selected in such a way that the maximum inner diameter of the ring exceeds the inner diameter of the bead by approximately 10 percent (a ratio of 38:43 has been found to be quite satisfactory). Furthermore, it has been found that a bead (such as 11) whose width (as considered in the axial direction of the clamping ring) is between 1.5 and 1.8 mm is quite satisfactory.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A hose coupling comprising:
    (a) a pipe having a first end portion provided with an end face and an external, circumferentially extending, ring-shaped collar;
    (b) a hose fabricated from a material which can be permanently deformed upon the application of heat and pressure, said hose having a second end portion which surrounds said first end portion, the outer diameter of said second end portion in undeformed condition thereof exceeding the outer diameter of said collar and the inner diameter of said second end portion in undeformed condition thereof being less than the outer diameter of said collar and less than the outer diameter of said first end portion; and
    (c) a one-piece, ring-shaped clamping device having one internal, ring-shaped bead, the length of said one bead being substantially less than the length of said clamping device, and the inner diameter of said clamping device at said one bead exceeding the outer diameter of said collar and being less than the outer diameter of said second end portion in undeformed condition of the latter, the wall thickness of said second end portion in undeformed condition thereof exceeding half the difference between the inner diameter of the clamping device at said one bead and the outer diameter of said collar, and said clamping device being designed to be mounted on said second end portion before the latter surrounds said first end portion and to be passed over said collar together with said second end portion by relative axial movement of said end portions to thereby generate a compressive force for urging said second end portion against said first end portion, said one bead surrounding and bearing against said second end portion on the side of said collar remote from said end face, and said clamping device independently holding said second end portion in engagement with said first end portion.

2. A coupling as defined in claim 1, wherein said second end portion is elastically deformable.

3. A coupling as defined in claim 1, wherein said clamping device is unbroken in circumferential direction thereof.

4. A coupling as defined in claim 1, wherein said collar is unbroken in circumferential direction thereof.

5. A coupling as defined in claim 1, wherein said clamping device has opposite ends and said bead is located at one of said ends.

6. A coupling as defined in claim 1, wherein said bead consists of elastically deformable material.

7. A coupling as defined in claim 6, wherein said elastically deformable material is a metal.

8. A coupling as defined in claim 6, wherein said elastically deformable material is a synthetic plastic substance.

9. A coupling as defined in claim 1, wherein said clamping device includes a second internal bead located between said one bead and said end face.

10. A coupling as defined in claim 9, wherein said second bead has an inner diameter which at least approximates the inner diameter of said one bead.

11. A coupling as defined in claim 9, wherein the thickness of said clamping ring, as considered radially of said end portions, decreases in a direction from one of said beads toward the other of said beads.

12. A coupling as defined in claim 9, wherein said clamping device has an external surface having a first portion of substantially constant diameter surrounding said one bead and a second portion whose diameter decreases in a direction toward said end face of said pipe.

13. A coupling as defined in claim 9, wherein said clamping ring has an internal surface between said beads, said internal surface having a first portion which is adjacent to said one bead and whose diameter increases in a direction toward said second bead, and a second portion which is adjacent to said second bead and whose diameter increases in a direction toward said one bead.

14. A coupling as defined in claim 9, wherein said clamping device has a substantially V-shaped cross-sectional outline with two divergent prongs which constitute sections of said one and said second beads.

15. A coupling as defined in claim 1, wherein said collar has a conical surface whose diameter decreases toward said end face of said pipe.

16. A coupling as defined in claim 1, wherein said one bead of said clamping device has a concave internal surface defining an undercut recess.

17. A coupling as defined in claim 1, wherein said one bead has a convex external surface.

18. A coupling as defined in claim 1, wherein said clamping device has axially parallel slots.

19. A coupling as defined in claim 18, wherein said slots have open ends facing toward said end face of said first end portion.

20. A coupling as defined in claim 18, wherein said clamping device includes a second internal bead located between said one bead and said end face, said slots extending through said second bead.

21. A coupling as defined in claim 18, wherein said clamping device has first, and second ends, one of said ends being remote from said one bead, and said slots extending from the other of said ends and at least halfway to said one end.

22. A coupling as defined in claim 18, wherein said clamping device includes a second bead disposed between said one bead and said end face, said slots being provided intermediate said beads.

23. A coupling as defined in claim 18, wherein said clamping device has a second internal bead disposed intermediate said one bead and said end face, and a connecting portion between said beads, said slots being provided in said beads.

24. A coupling as defined in claim 18, wherein said clamping device further includes a second internal bead between said one bead and said end face, and a connecting portion intermediate said beads, said slots being provided in said intermediate portion and said second bead.

25. A coupling as defined in claim 1, wherein said clamping device has an internal surface which is adjacent to said one bead and whose diameter increases in a direction away from said one bead, as considered in the axial direction of said end portions, to a value which at least equals the outer diameter of said second end portion on said first end portion.

26. A coupling as defined in claim 1, wherein said one bead has an innermost portion with a surface whose width, as considered in the axial direction of said end portions, is such that said compressive force is in the range of 80–160 newtons during axial movement of said clamping device to slide over said collar.

27. A coupling as defined in claim 26, wherein said compressive force is approximately 100 newtons.

28. A coupling as defined in claim 1, wherein said second end portion has an external surface with a circumferential groove, at least a portion of said clamping device extending into said groove.

29. A coupling as defined in claim 28, wherein said second end portion has an end face and said groove is adjacent to such end face.

30. A coupling as defined in claim 28, wherein said external surface has two circumferential flanges flanking said groove.

31. A coupling as defined in claim 28, wherein the width of said groove at least approximates the length of said clamping device, as considered in the axial direction of said end portions.

32. A coupling as defined in claim 28, wherein the width of said groove substantially equals the length of said one bead, as considered in the axial direction of said end portions.

* * * * *